United States Patent
Wan

(10) Patent No.: US 11,847,769 B2
(45) Date of Patent: Dec. 19, 2023

(54) PHOTOGRAPHING METHOD, TERMINAL, AND STORAGE MEDIUM

(71) Applicant: BEIJING XIAOMI PINECONE ELECTRONICS CO., LTD., Beijing (CN)

(72) Inventor: Shaohua Wan, Beijing (CN)

(73) Assignee: BEIJING XIAOMI PINECONE ELECTRONICS CO., LTD., Beijing (CN)

(*) Notice: Subject to any disclaimer, the term of this patent is extended or adjusted under 35 U.S.C. 154(b) by 246 days.

(21) Appl. No.: 17/332,210

(22) Filed: May 27, 2021

(65) Prior Publication Data

US 2022/0207676 A1    Jun. 30, 2022

(30) Foreign Application Priority Data

Dec. 25, 2020   (CN) .......................... 202011563021.6

(51) Int. Cl.
 *G06T 5/50* (2006.01)
 *G06T 7/11* (2017.01)
 (Continued)

(52) U.S. Cl.
 CPC .............. *G06T 5/50* (2013.01); *G06T 3/4053* (2013.01); *G06T 5/003* (2013.01); *G06T 7/11* (2017.01);
 (Continued)

(58) Field of Classification Search
 CPC ......... G06T 5/50; G06T 3/4053; G06T 5/003; G06T 7/11; G06T 2207/20221;
 (Continued)

(56) References Cited

U.S. PATENT DOCUMENTS

| 11,356,604 B2 * | 6/2022 | Woodall | H04N 23/681 |
| 2011/0182528 A1 * | 7/2011 | Scherteler | G06T 3/4061 382/274 |

(Continued)

FOREIGN PATENT DOCUMENTS

| CN | 110136062 A * | 8/2019 | G06K 9/342 |
| CN | 110136062 A | 8/2019 | |

(Continued)

OTHER PUBLICATIONS

MEC:Memory-efficient Convolution for Deep Neural Network, Minsik Cho1 Daniel Brand, arXiv:1706.06873 [cs.LG] (Year: 2017).*
(Continued)

*Primary Examiner* — Gandhi Thirugnanam
(74) *Attorney, Agent, or Firm* — COZEN O'CONNOR

(57) ABSTRACT

Multiple images are continuously captured based on a photographing instruction. Multiple processed images without ghosts are obtained based on the multiple images. A fused image is obtained by inputting the multiple processed images without ghosts into an image fusion model. Noise of the fused image is lower than noise of any one of the multiple images, and a resolution of the fused image is higher than a resolution of any one of the multiple images. A target image is obtained and output by performing image enhancement processing on the fused image.

16 Claims, 5 Drawing Sheets

(51) Int. Cl.
  *G06T 3/40* (2006.01)
  *G06T 5/00* (2006.01)
  *H04N 23/951* (2023.01)

(52) U.S. Cl.
  CPC . *H04N 23/951* (2023.01); *G06T 2207/20221* (2013.01)

(58) Field of Classification Search
  CPC .......... G06T 5/002; G06T 5/007; G06T 7/10; G06T 2207/20081; G06T 2207/20084; H04N 23/951; H04N 23/80; H04N 5/211; H04N 23/81; G06N 3/08; G06N 20/10
  See application file for complete search history.

(56) References Cited

U.S. PATENT DOCUMENTS

| | | | | |
|---|---|---|---|---|
| 2014/0333801 | A1* | 11/2014 | Moon | H04N 23/683 348/231.99 |
| 2015/0078661 | A1* | 3/2015 | Granados | G06T 5/50 382/167 |
| 2017/0323433 | A1* | 11/2017 | Ukil | G06T 7/254 |
| 2018/0012337 | A1* | 1/2018 | Puetter | H04N 19/182 |
| 2020/0401149 | A1* | 12/2020 | Gong | G06N 3/045 |
| 2022/0207676 | A1* | 6/2022 | Wan | G06T 5/002 |

FOREIGN PATENT DOCUMENTS

| | | | | |
|---|---|---|---|---|
| EP | 4105877 | A1 * | 12/2022 | G06T 3/4053 |
| JP | 2015121884 | A | 7/2015 | |
| JP | 2015525648 | A | 9/2015 | |
| JP | 2015197818 | A | 11/2015 | |
| JP | 2017505004 | A | 2/2017 | |
| JP | 2017537403 | A | 12/2017 | |
| JP | 2018097731 | A | 6/2018 | |
| KR | 20160142760 | A | 12/2016 | |
| KR | 20200135102 | A | 12/2020 | |
| WO | WO 2020033427 | A1 | 2/2020 | |

OTHER PUBLICATIONS

European Patent Application No. 21176305.7 extended Search and Opinion dated Nov. 23, 2021, 11 pages.
Daithankar, M.V. et al. "Video Super Resolution: A Review" Proceedings of the 1st International Conference on Data Science, Machine Learning and Applications; Proceedings of ICMEET 2017; May 1, 2020.
Li, X. et al. "Example-based image super-resolution with class-specific predictors"; Journal of Visual Communication and Image Representation, Academic Press, Inc., vol. 20, No. 5, Jul. 1, 2009, pp. 312-322.
Srikantha, A. et al. "Ghost detection and removal for high dynamic range images: Recent advances"; Signal Processing: Image Communication, vol. 27, No. 6, Jul. 1, 2012, pp. 650-662.
Korean Patent Application No. 10-2021-0065213, Office Action dated May 20, 2022, 6 pages.
Korean Patent Application No. 10-2021-0065213, English translation of Office Action dated May 20, 2022, 7 pages.
Japanese Patent Application No. 2021-091760, Office Action dated Jul. 12, 2022, 3 pages.
Japanese Patent Application No. 2021-091760, English translation of Office Action dated Jul. 12, 2022, 3 pages.

* cited by examiner

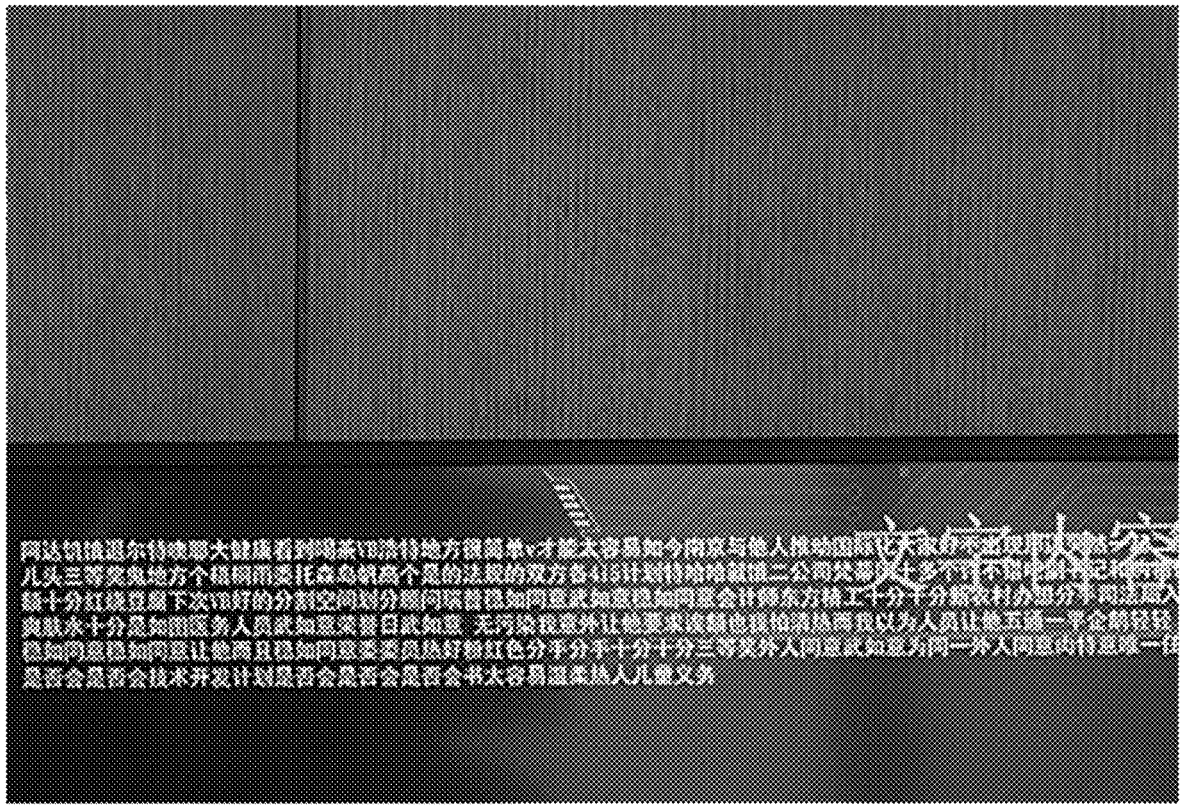
FIG. 4
$$M \begin{array}{|c|}\hline K \\ A \\ \hline\end{array} * K \begin{array}{|c|}\hline N \\ B \\ \hline\end{array} = M \begin{array}{|c|}\hline N \\ C \\ \hline\end{array}$$
FIG. 5
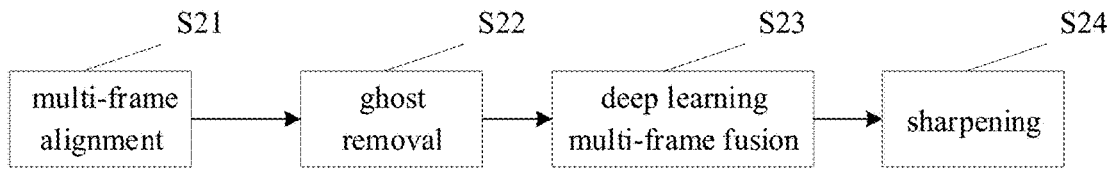
FIG. 6

PHOTOGRAPHING METHOD, TERMINAL, AND STORAGE MEDIUM

CROSS REFERENCE TO RELATED APPLICATIONS

This application claims priority and benefits to Chinese Application No. 202011563021.6, filed on Dec. 25, 2020, the entire content of which is incorporated herein by reference.

TECHNICAL FIELD

The disclosure relates to a field of electronic equipment technologies, and particularly to a photographing method, a photographing device, a terminal, and a storage medium.

BACKGROUND

High-end mobile devices such as mobile phones include multiple cameras, for meeting different requirements of users on taking pictures. Based on the optical zoom, the super-resolution algorithm can achieve continuous zoom and large-magnification digital zoom. FIG. 1 is a schematic diagram illustrating an optical zoom lens. The lens can achieve 5× optical zoom. With the super-resolution algorithm, the lens can achieve up to 50× continuous digital zoom.

SUMMARY

In a first aspect, a photographing method includes: continuously capturing multiple images based on a photographing instruction; obtaining, from the multiple images, multiple processed images without ghosts; obtaining a fused image by inputting the multiple processed images without ghosts into an image fusion model, noise of the fused image being lower than noise of any one of the multiple images, and a resolution of the fused image being higher than a resolution of any one of the multiple images; and obtaining and outputting a target image by performing image enhancement processing on the fused image.

In a second aspect, a terminal includes: a processor and a memory storing machine-readable instructions, that when executed by the processor, control the processor to execute the photographing method of the first aspect.

In a third aspect, a storage medium has instructions stored thereon. When the instructions are executed by a processor of a terminal, the terminal is caused to execute the photographing method of the first aspect.

It is to be understood that the above general description and the following detailed description are only exemplary and explanatory and do not limit the disclosure.

BRIEF DESCRIPTION OF THE DRAWINGS

The drawings herein are incorporated into the specification and constitute a part of the specification, illustrating examples conforming to the disclosure, and used to explain the principle of the disclosure together with the specification.

FIG. 4 is a schematic diagram illustrating a text obtained according to the disclosure.

FIG. 5 is a schematic diagram illustrating convolution according to the disclosure.

FIG. 6 is flowchart illustrating a super-resolution algorithm applied in a photographing operation according to the disclosure.

DETAILED DESCRIPTION

Figure 1:
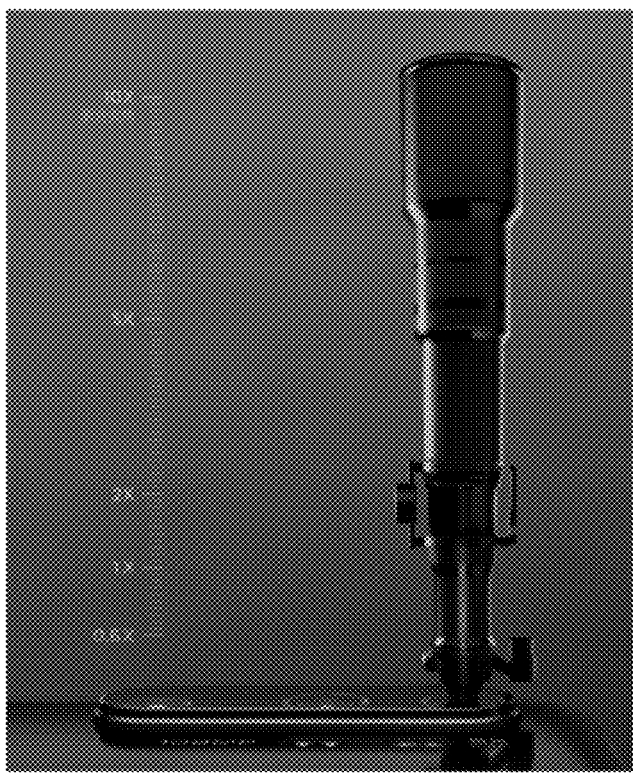
FIG. 1 is a schematic diagram illustrating an optical zoom lens.

The exemplary embodiments will be described in detail here, and examples thereof are illustrated in the accompanying drawings. When the following description refers to the drawings, unless otherwise indicated, the same numbers in different drawings indicate the same or similar elements. The implementation manners described in the following exemplary embodiments do not represent all implementation manners consistent with the disclosure. On the contrary, they are merely examples of devices and methods consistent with some aspects of the disclosure as detailed in the appended claims.

Super-resolution algorithm may improve a zoom capability of a terminal. The terminal may be a mobile terminal, such as a mobile device, mobile phone, a tablet, and a portable computer, or the like. The super-resolution algorithm can include a single-frame super-resolution algorithm and a multi-frame super-resolution algorithm. At present, the multi-frame super-resolution algorithm is widely used in the mobile phone zoom system. In other words, after triggering a photographing key, the mobile phone will continuously capture multiple images, and the multiple images may be fused through an algorithm to obtain a high-quality image output. The multi-frame super-resolution algorithm has obvious advantages over the single-frame super-resolution algorithm in terms of noise and resolution.

Therefore, the disclosure provides a photographing method based on the multi-frame super-resolution algorithm.

The photographing method includes: continuously capturing multiple images based on a photographing instruction; obtaining, from the multiple images, multiple processed images without ghosts; obtaining a fused image by inputting the multiple processed images without ghosts into an image fusion model, noise of the fused image being lower than noise of any one of the multiple images, and a resolution of the fused image being higher than a resolution of any one of the multiple images; and obtaining and outputting a target image by performing image enhancement processing on the fused image.

In some examples, the image fusion model includes multiple super-resolution models, and each super-resolution model corresponds to a respective image type. Obtaining the fused image by inputting the multiple processed images without ghosts into the image fusion model includes: obtaining multiple region images by performing image segmentation on a processed image without ghost; obtaining a fused region image corresponding to a common image type by inputting region images corresponding to the common image type into the super-resolution model corresponding to the common image type, where noise of the fused region image corresponding to the common image type is lower than that of any one of the multiple region images corresponding to the common image type, and a resolution of the fused region image corresponding to the common image type is higher than a resolution of any one of the region images corresponding to the common image type; and obtaining the fused image by fusing the fused region images corresponding to different image types.

In some examples, obtaining the multiple region images by performing the image segmentation on the processed image without ghost includes: determining a pixel type for a pixel of the processed image without ghost; determining an image type for the pixel based on the pixel type; and gathering pixels corresponding to the common image type into the same region image, and obtaining the multiple region images.

In some examples, obtaining the fused image by fusing the fused region images corresponding to different image types includes: obtaining the fused image by fusing the fused region images corresponding to different image types based on weights of pixels in the region images corresponding to the fused region images.

In some examples, the super-resolution model includes multiple modules, and each module includes a convolutional layer, a normalization layer, and an activation layer. Obtaining the fused region image corresponding to the common image type by inputting region images corresponding to the common image type into the super-resolution model corresponding to the common image type includes: obtaining a convolution result by inputting the region images corresponding to the common image type into the convolutional layer of the super-resolution model corresponding to the common image type; obtaining a normalized result by inputting the convolution result into the normalization layer; and obtaining the fused region image corresponding to the common image type based on the normalized result and the activation layer, an input of the activation layer being the normalized result.

In some examples, obtaining the convolution result by inputting the region images corresponding to the common image type into the convolutional layer of the super-resolution model corresponding to the common image type includes: converting M convolution kernels having P rows and L column of the convolutional layer into a two-dimensional convolution matrix having M rows and P×L columns; where M, P, and L are all positive integers; obtaining multiple two-dimensional image matrices to be convolved based on a size of each convolution kernel, a preset convolution sliding stride length, and the multiple region images, where each column in the two-dimensional image matrix to be convolved has P×L pieces of data, data of each column is the data to be intercepted when a convolution operation is performed on a region image with a convolution kernel, and the number of columns of the two-dimensional image matrix to be convolved is a maximum number of convolution operations supported by the region image; and obtaining the convolution result by multiplying the two-dimensional convolution matrix by each of the two-dimensional image matrix to be convolved.

In some examples, different image types of images include at least one of images with texture characteristics, images with color characteristics, images with shape characteristics, and images of spatial relationship.

In some examples, obtaining, from the multiple images, multiple processed images without ghosts includes: obtaining multiple aligned images by aligning the multiple images; and obtaining the multiple processed images by performing ghost removal processing on the multiple aligned images.

In some examples, obtaining and outputting the target image by performing image enhancement processing on the fused image includes: obtaining and outputting the target image by performing sharpening processing on the fused image.

A photographing device includes: a capturing module, configured to continuously capture multiple images based on a photographing instruction; a removing module, configured to obtain, from the multiple images, multiple processed images without ghosts; a fusing module, configured to obtain a fused image by inputting the multiple processed images without ghosts into an image fusion model, noise of the fused image being lower than noise of any one of the multiple images, and a resolution of the fused image being higher than a resolution of any one of the multiple images; and an enhancing module, configured to obtain and output a target image by performing image enhancement processing on the fused image.

In some examples, the image fusion model includes multiple super-resolution models, and each super-resolution model corresponds to a respective image type. The fusing module is further configured to: obtain multiple region images by performing image segmentation on a processed image without ghost; obtain a fused region image corresponding to a common image type by inputting region images corresponding to the common image type into the super-resolution model corresponding to the common image type, noise of the fused region image corresponding to the common image type being lower than that of any one of the multiple region images corresponding to the common image type, and a resolution of the fused region image corresponding to the common image type being higher than a resolution of any one of the region images corresponding to the common image type; and obtain the fused image by fusing the fused region images corresponding to different image types.

In some examples, the fusing module is further configured to determine a pixel type for a pixel of the processed image without ghost; determine an image type for the pixel based on the pixel type; and gather pixels corresponding to the common image type into the same region image and obtain multiple region images.

In some examples, the fusing module is further configured to obtain the fused image by fusing the fused region images corresponding to different image types based on weights of pixels in the region images corresponding to the fused region images.

In some examples, the super-resolution model includes multiple modules, and each module includes a convolutional layer, a normalization layer, and an activation layer.

The fusing module is further configured to obtain a convolution result by inputting the region images corresponding to the common image type among the multiple region images into the convolutional layer in the super-resolution model corresponding to the common image type; obtain a normalized result by inputting the convolution result into the normalization layer; and obtain the fused region image corresponding to the common image type based on the normalized result and the activation layer, an input of the activation layer being the normalized result.

In some examples, the fusing module is further configured to convert M convolution kernels having P rows and L column of the convolutional layer into a two-dimensional convolution matrix having M rows and P×L columns; where M, P, and L are all positive integers; obtain multiple two-dimensional image matrices to be convolved based on a size of each convolution kernel, a preset convolution sliding stride length, and the multiple region images, where each column in the two-dimensional image matrix to be convolved has P×L pieces of data, data of each column is the data to be intercepted when a convolution operation is performed on a region image with a convolution kernel, and the number of columns of the two-dimensional image matrix to be convolved is a maximum number of convolution operations supported by the region image; and obtain the convolution result by multiplying the two-dimensional convolution matrix by each of the two-dimensional image matrix to be convolved.

In some examples, different image types of images include at least one of images with texture characteristics, images with color characteristics, images with shape characteristics, and images of spatial relationship.

In some examples, the removing module is further configured to align the multiple images to obtain multiple aligned images; and obtain the multiple processed images by performing ghost removal processing on the multiple aligned images.

In some examples, the enhancing module is further configured to obtain and output the target image by performing sharpening processing on the fused image.

A terminal includes: a processor and a memory storing machine-readable instructions, that when executed by the processor, control the processor to execute a photographing method as described above.

A storage medium has instructions stored thereon. When the instructions are executed by a processor of a terminal, the terminal is caused to execute a photographing method as described above.

In the disclosure, by adopting a multi-frame super-resolution algorithm, the multiple processed images that are aligned and ghost-removed are input to the image fusion model that is pre-trained based on the deep learning network, and the fused image with reduced noise and improved resolution is obtained. Further, the image enhancement is performed on the fused image to obtain and output the target image with improved image quality, without the need of a separate noise reduction module or a separate super-resolution module to obtain the super-resolution image. Therefore, the disclosure may have characteristics of high integration and good processing effect.

Figure 2:
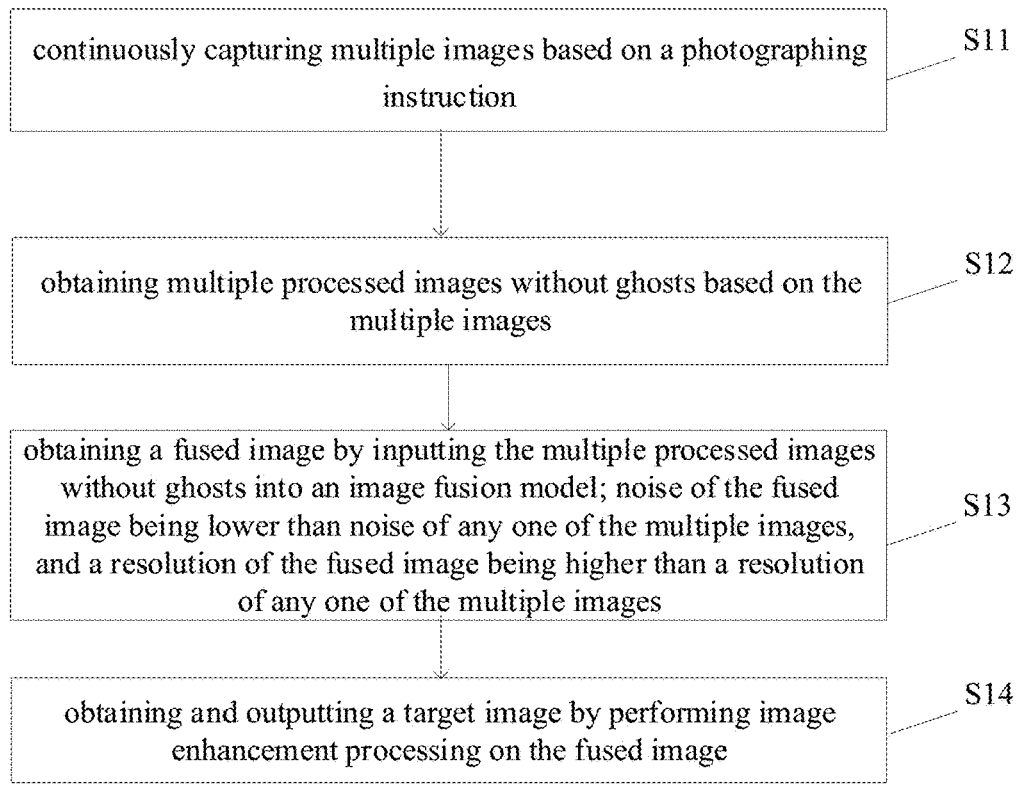
FIG. 2 is a flowchart illustrating a photographing method according to some embodiments of the disclosure.

FIG. 2 is a flowchart illustrating a photographing method according to some embodiments of the disclosure. As illustrated in FIG. 2, the photographing method applied to a terminal may include the following.

At S11, multiple images (or multiple frames) are continuously captured based on a photographing instruction.

At S12, multiple processed images without ghosts are obtained based on the multiple images.

At S13, the multiple processed images are input to an image fusion model to obtain a fused image. Noise of the fused image is lower than noise of any one of the multiple images, and a resolution of the fused image is higher than a resolution of any one of the multiple images.

At S14, a target image is obtained and output by performing image enhancement processing on the fused image.

For example, the terminal may include, but be not limited to, a smart phone, a camera, a tablet computer, or a wearable electronic device, etc. The terminal is provided with an image capturing component, such that the mobile terminal may capture images through the image capturing component. In cases where the terminal is a mobile phone, the image capturing component may include a front camera and a rear camera of the mobile phone.

In block S11, the terminal may continuously capture multiple images based on the photographing instruction. The multiple images may be low dynamic range (LDR) images with different exposure levels and captured for the same photographing scene. For example, the multiple images may be an image with a short exposure time, an image with a normal exposure time, and an image with a long exposure time.

Figure 3:
FIG. 3 is a schematic diagram illustrating a ghost image according to the disclosure.

In block S12, the terminal obtains the multiple processed images after the ghosts are removed from the multiple images. Because the handheld device is inevitably shaken or the photographed object moves during the photographing process, the image will be shifted or distorted, resulting in artifact (i.e., the ghost) on the captured images. FIG. 3 is a schematic diagram illustrating an image having a ghost according to the disclosure. As illustrated in FIG. 3, on the left side of the image, the ghost appears on the surface of the glass in the image due to the hand shaking during the photographing process.

In view of the above, the disclosure may remove the ghosts from the multiple captured images. In the disclosure, in order to improve the effect of removing the ghosts, the multiple captured images may be aligned first and the ghost can be removed. The challenge on the frame alignment is that the accuracy of the frame alignment is on the sub-pixel level, and the frame alignment needs to be applicable to an extremely dark scene.

In the disclosure, the block S12 may include aligning the multiple images, and performing a ghost removal processing on the multiple aligned images to obtain the processed images without the ghosts.

The multiple images can be aligned based on a median threshold bitmaps (MTB) method. In addition, any one of the multiple images can be used as a reference image, and the remaining images (also referred to as non-reference images) can be aligned to the reference image. For example, by extracting the feature points of the reference image and a non-reference image, the non-reference image and the reference image are registered based on the feature points to achieve the frame alignment.

In block S13, after the terminal obtains the multiple processed images without the ghosts, the multiple processed images will be input to the image fusion model. The image fusion model may have a noise reduction function and a super-resolution function. Therefore, the fused image has lower noise and higher resolution than any one of the multiple processed images without the ghosts.

In an example, the image fusion model may be trained based on a support vector machine. In another example, the image fusion model may be trained through a deep learning network.

It is to be noted that the disclosure is not limited to using the support vector machines or the deep learning network to train the image fusion model. In addition, in training the image fusion model, the input images in the training set are low-resolution images with a lot of noise, while label images (Ground Truth, GT images) are high-resolution images with low noise. A pair of training data may be represented in a form of (x, y), where x represents the multiple input images and y represents multiple output images. The image fusion model is to fit a correspondence, such as $y=f(x)$, between x and y through a support vector machine network or a deep learning network. The function $f(x)$ has both a noise reduction ability and a super-resolution ability.

At S14, the terminal may perform the image enhancement processing on the fused image with reduced noise and increased resolution after obtaining the fused image, and the terminal obtains and outputs a target image of improved image quality.

The output target image is the image finally presented to the user based on the photographing instruction.

The block S14 may include: sharpening the fused image to obtain and output the target image.

The image enhancement processing includes sharpening processing. The sharpening processing can compensate for the profile of the image, enhance edges and a grayscale-jump part of the image, so that the image becomes clearer and thus the target image of higher quality is obtained, thereby improving user experience.

However, the image enhancement processing is not limited to the sharpening processing. For example, the image enhancement processing can also be a combination of the sharpening processing and other enhancement processing methods, at least one of the other image enhancement methods including contrast increasement, color correction, or the like.

In the super-resolution algorithm, noise, details, and defects are main consideration factors for evaluating the super-resolution image quality. The goal of the super-resolution algorithm is to improve the image quality in three aspects: details, noise, and defects. In the disclosure, with the multi-frame super-resolution algorithm, the multiple processed images obtained after the ghost removal processing are input into the pre-trained image fusion model, and the fused image with reduced noise and increased resolution can be obtained. The image enhancement processing may be performed on the fused image to obtain and output the target image with improved image quality, without the need to obtain the super-resolution image through an independent noise reduction module or an independent super-resolution module. Thus, the method has characteristics of high integration and good processing effect.

The image fusion model may include multiple super-resolution models, where each super-resolution model corresponds to a respective image type.

The block S13 may include performing image segmentation on each of the multiple processed images obtained after the ghost removal processing, to obtain multiple region images; inputting the region images corresponding to a common image type among the multiple region images into the super-resolution model corresponding to the common image type to obtain a fused region image corresponding to the common image type, where the noise of the fused region image corresponding to the common image type is lower than the noise of any one of the multiple region images corresponding to the common image type, and the resolution of the fused region image corresponding to the common image type is higher than the resolution of any one of the multiple regional images corresponding to the common image type; and fusing the fused region images corresponding to different image types to obtain the fused image.

Because different types of images provide people with different subjective feelings, the disclosure may train super-resolution models for different image types. The image fusion model may include a super-resolution model corresponding to a respective image type. The super-resolution model may be a model trained based on the deep learning network.

Different image types of images may include at least one of images with texture characteristics, images with color characteristics, images with shape characteristics, and images of spatial relationship.

For example, for regions with strong text randomness, such as road surfaces, tree lines, grasslands, property of the overall structure may be relatively weak. If the model can retain more noise, it can provide people with "subjective illusion" that the details are enhanced. For images of a specific spatial relationship, such as text, architecture, and human faces, more attention may be paid to high-level semantic cognition, and less attention to textures, i.e., more attention to the overall structure. Therefore, the model needs for stronger noise reduction and better structural details. FIG. 4 is a schematic diagram illustrating a text obtained according to the disclosure. More attention may be paid to the structural characteristic of each word.

In an example, the sky is blue, the trees are green or yellow, the river is approximately transparent, and the skin color is yellow or black. Each specific object will have its own possible color, such that the model may need to pay more attention to the color characteristics. In another example, the sun is round, the moon is sickle-shaped or round. Each specific object has its own possible shape, such that the model may need to pay more attention to shape characteristics.

Therefore, in the disclosure, for an image corresponding to an image type, the super-resolution model corresponding to the image type is provided. It is to be noted that for training the image fusion model in the disclosure, a large number of images with high noise and low resolution and whose main characteristics are the texture characteristics can be selected as the input images, and images with low noise and high resolution can be used as the label images, to train the super-resolution model. Similarly, super-resolution models that mainly focus on the structural characteristics, the color characteristics, or the spatial relationships respectively can also be trained separately, which will not be described in detail in this disclosure.

However, generally the captured image is not an image of a single object. For example, there may be buildings, trees, and sky in the captured image. Different objects have different characteristics. For example, as mentioned above, more attention may be paid to the overall structure for buildings, more attention may be paid to textures for trees, and more attention may be paid to colors for the sky. Therefore, the disclosure can separately segment each of the multiple processed images obtained after the ghost removal processing in advance, to obtain different image types of region images for each processed image obtained after the ghost removal processing. For example, the above image may be divided into a building region, a tree region, and a sky region through the image segmentation.

It is to be noted that because the multiple images are continuously captured and the similarity degree of the image content between the multiple images is high, after the image segmentation is performed separately on different processed images obtained after the ghost removal processing, the image types corresponding to the obtained region images are the same for each processed image. Certainly, there may also be some processed images having less image types than other processed images after performing the image segmentation on the processed images. In a condition that an image type is lost for a processed image, the image region corresponding to the image type in the processed image may be ignored in the disclosure.

In the disclosure, for the image segmentation, an image segmentation result may be obtained based on a pre-trained neural network model. The image segmentation result includes the region images obtained by segmenting the processed image and the image types corresponding to the region images.

Performing the image segmentation on each of the multiple processed images obtained after the ghost removal processing to obtain multiple region images may include determining a respective pixel type for each pixel of a processed image, determining a respective image type for each pixel based on the respective pixel type; and classifying pixels corresponding to the common image type into the same region image, and obtaining multiple region images for each processed image.

For example, a statistics operation is performed on the pixel types of the pixels contained in the processed image obtained after the ghost removal processing. For example, a region growing method may be adopted to gather, starting from a pixel, the pixels corresponding to the common image type into the same region image, to obtain multiple region images for each processed image. After obtaining different image types of region images included in each processed image that is obtained after removing the ghosts, multi-frame region images corresponding to the common image type (the multi-frame region images are from multiple processed images respectively and correspond to the common image type) may be input to the super-resolution model corresponding to the common image type, to obtain a fused region image corresponding to the common image type. For example, when the common image type corresponding to the multi-frame region images is the texture type, the multi-frame region images can be input into the super-resolution model corresponding to the texture type to obtain the fused region image with more texture details, reduced noise, and improved resolution.

After obtaining the fused region images corresponding to different image types, the fused region images can be spliced into a complete fused image based on position information of the region images in processed image during the image segmentation. Since the noise of each fused region image is reduced and the resolution of each fused region image is improved, the resultant fused image is an image with reduced noise and improved resolution.

Fusing the fused region images of different image types to obtain the fused image may include fusing the fused region images of the different image types based on weights of pixels in the region images corresponding to fused region images of different images types, to obtain the fused image.

In the disclosure, for splicing the fused region images into the completed fused image based on the position information of the region images of different image types, the fused region images can be fused into the fused image based on the weights of the different image types of region regions. For example, in a condition that a region image corresponding to the texture feature is in the center of the processed image, the weight of each pixel in the region image corresponding to the texture feature can be set larger than pixels in other region images, to highlight the central region in the fused image.

It is to be noted that, in the disclosure, the input image of the image fusion model may also be a local region image of an image, and the local region image may be obtained by performing the image segmentation on a training image, which are not repeated in the disclosure.

If the deep learning network based on convolutional neural network is used for model training, due to the characteristics of the convolutional neural network, in the related arts, the entire image may be operated through the model without paying attention to the type characteristics of different regions in the image. As a result, the image quality of the obtained super-resolution image cannot be improved well. In the disclosure, the complexity of the photographing scenes is considered, and super-resolution models corresponding to different image types are trained. Therefore, after the image segmentation is performed on each of the multiple processed images that are obtained after the ghost removal processing, the fused region images are obtained through the super-resolution models corresponding to the image types. Therefore, the image quality of the super-resolution image may be improved greatly. In addition, in the disclosure, the region image is input to a corresponding super-resolution model, without the need to operate the entire image by the model, thereby greatly reducing the amount of calculation.

The super-resolution model may include multiple modules, and each module may include a convolutional layer, a normalization layer, and an activation layer.

Inputting the multiple region images corresponding to the common image type into the super-resolution model corresponding to the common image type to obtain the fused region image corresponding to the common image type may include inputting the multiple region images corresponding to the common image type into the convolution layer in the super-resolution model corresponding to the common image type to obtain a convolution result, inputting the convolution result into the normalization layer to obtain a normalized result, and obtaining the fused region image corresponding to the common image type based on the normalized result and the activation layer, where the input of the activation layer is the normalized result.

As mentioned above, the super-resolution model may be a model trained through the deep learning network. In the disclosure, the super-resolution model includes multiple modules, for example 16 modules, and each module includes a convolutional layer, a normalization layer, and an activation layer. In using the super-resolution model, multiple region images corresponding to the common image type can be input to the convolutional layer in each module of the corresponding super-resolution model to obtain the convolution result, and the normalized result that the values are within a predetermined value range can be obtained based on the convolution result and the normalization layer, for subsequent calculations. Further, in obtaining the fused region image corresponding to the common image type based on the normalized result and the activation layer, the normalized result can be input to the activation layer to improve the expressive ability of the model, the output of the activation layer in each module is input to a pooling layer, and the output of the pooling layer is used as the input of the fully connected layer to obtain the fused region image corresponding to the common image type.

As mentioned above, the disclosure inputs the image regions into the corresponding super-resolution models without the need of operating the entire image by the model, which can greatly reduce the amount of calculation. Each super-resolution model only performs the convolution operations on the region images corresponding to the image type that is the same as the super-resolution model, and does not perform the convolution operations on other regions corresponding to other image types. As a result, the amount of calculation is not related to the number of models, thereby greatly reducing the amount of calculation.

Inputting the multiple region images corresponding to the common image type into the convolutional layer of the super-resolution model corresponding to the common image type to obtain the convolution result may include converting M convolution kernels including P rows and L columns of the convolutional layer into a two-dimensional convolution matrix having M rows and P×L columns, where M, P and L are all positive integers; obtaining multiple two-dimensional image matrices to be convoluted based on a size of each convolution kernel, a preset convolution sliding stride length, and the multiple region images, where each column of a two-dimensional image matrix to be convolved has a total of P×L pieces of data, data of each column is the data to be intercepted when a convolution operation is performed on a region image with a convolution kernel, and the number of columns of the two-dimensional image matrix to be convolved is a maximum number of convolution operations supported by the region image; and multiplying the two-dimensional convolution matrix by each of the two-dimensional image matrix to be convolved to obtain the convolution result.

In the disclosure, the super-resolution model may include M convolution kernels (the size is P×L), and the M convolution kernels may be transformed into the two-dimensional convolution matrix with M rows and P×L columns. That is, a two-dimensional convolution kernel is transformed into a one-dimensional convolution kernel, and multiple obtained one-dimensional convolution kernels form a two-dimensional convolution matrix. Each row of the obtained two-dimensional convolution matrix is the weight value of a two-dimensional convolution kernel.

For example, M is the number of convolution kernels, and the size P×L of each convolution kernel is k×k. Each row of the obtained two-dimensional convolution matrix is a convolution kernel vector and has k×k weight values. The obtained two-dimensional convolution matrix has a total of M rows which represent the M convolution kernels.

Further, in the disclosure, the two-dimensional image matrix to be convolved is obtained based on the size of each convolution kernel, the preset convolution sliding stride length, and a single-frame region image. The single-frame region image refers to that the region image is from a single frame.

It is to be noted that in the disclosure, in order to ensure that the size of the matrix obtained after the convolution operation is consistent with the size of the region image input to the convolutional layer, when the size of the convolution kernel, the convolution sliding stride length, and the size of the region image to be convoluted do not meet the above requirements, the surrounding of the region image may be padded with data to obtain a padded region image (that is the region image is expanded), and the padded region image can be processed.

For example, the convolution kernel may be the two-dimensional matrix of k×k. The size in a row direction of the preset convolution sliding stride length may be stride_h and the size in a column direction may be stride_w. A padding length in the row direction may be pad_h and a padding length in the column direction may be pad_w. The size of each single-frame region image may be image_h×image_w. Therefore, the obtained two-dimensional image matrix to be convolved has k×k rows (i.e., P×L rows) and N columns, where N can be expressed by the following formula (1):

$$N=((\text{image\_}h+2\times\text{pad\_}h-k)/\text{stride\_}h+1)\times((\text{image\_}w+2\times\text{pad\_}w-k)/\text{stride\_}w+1) \quad (1)$$

Each column of the two-dimensional image matrix to be convolved has a total of k×k pieces of data. The data of each column is the data intercepted when the convolution operation is performed on a padded single-frame region image with a convolution kernel, and pixel values of the pixels on the padded single-frame region image are covered by N columns of data, where N is the maximum number of convolution operations supported by the padded single-frame region image. In padding the single-frame region image, data of the value 0 will be filled around the single-frame region image, where a distance between boundaries of the filled data and the single-frame region image is the preset padding size.

If the surrounding of region image is not padded with data, the value of N which is the number of columns of the two-dimensional image matrix to be convolved equals to a value when pad_h and pad_w is both zero, and also the maximum number of convolution operations supported by the single-frame region image.

FIG. 5 is a schematic diagram illustrating a convolution process according to embodiments of the disclosure. As illustrated in FIG. 5, the size P×L of the two-dimensional convolution kernel is denoted as K. The above-mentioned convolution process is that the two-dimensional convolution matrix of M×K is multiplied by the two-dimensional image matrix of K×N to obtain a convolution result matrix of M×N, where each row of the convolution result matrix is a feature map.

It is to be understood that in the disclosure, by considering that the region images obtained after the image segmentation may not be regularly rectangular or have different shapes or sizes, the original convolution operation on the regular rectangles is modified to the sliding on the irregular shapes, to meet the convolution requirements without padding the irregularly shaped region images, and the final calculation complexity is also independent of the number of region images but only related to an area of the whole single image. Therefore, the algorithm complexity is reduced and the convolution efficiency is greatly improved.

FIG. 6 is a flowchart illustrating a super-resolution algorithm used in a photographing scene according to embodiments of the disclosure. As illustrated in FIG. 6, the super-resolution algorithm may include the following.

At S21, multi-frame alignment operation.

The multi-frame alignment operation is to align the multiple images continuously captured based on the photographing instruction.

At S22, ghost removal operation.

The ghost removal operation may be performed on the multiple aligned images to obtain the multiple processed images where the ghost is removed.

At S23, deep learning multi-frame fusion operation.

The multiple processed images obtained after the ghost removal processing may be input to an image fusion model that is pre-trained through a deep learning network. The image fusion model has both the function of noise reduction and the function of resolution improvement, such that a fused image with reduced noise and improved resolution may be obtained after inputting the multiple processed images obtained after the ghost removal processing into the image fusion model.

At S24, sharpening operation.

After the fused image with reduced noise and improved resolution is obtained through S23, the fused image can be sharpened to obtain a target image with improved image quality and the target image may be displayed to the user.

It is to be understood that, the disclosure adopts a multi-frame super-resolution algorithm, inputs the multiple processed images that are aligned and ghost-removed to the image fusion model that is pre-trained based on the deep learning network, and obtains the fused image with reduced noise and improved resolution. Further, the fused image is sharpened to obtain and output the target image with improved image quality, without the need of a separate noise reduction module or a separate super-resolution module to obtain the super-resolution image. Therefore, the disclosure may have characteristics of high integration and good processing effect.

Figure 7:
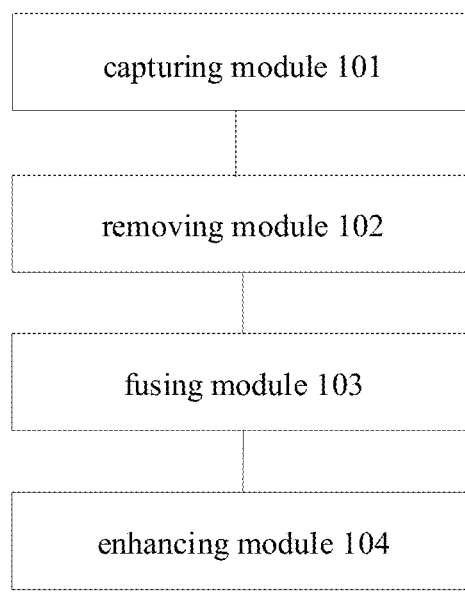
FIG. 7 is a schematic diagram illustrating a photographing device according to some embodiments of the disclosure.

FIG. 7 is a block diagram illustrating a photographing device according to some embodiments of the disclosure. As illustrated in FIG. 7, the photographing device may include a capturing module 101, a removing module 102, a fusing module 103, and an enhancing module 104.

The capturing module 101 is configured to continuously capture multiple images based on a photographing instruction.

The removing module 102 is configured to obtain, from the multiple images, multiple processed images without ghosts.

The fusing module 103 is configured to input the multiple processed images without ghosts into an image fusion model to obtain a fused image. Noise of the fused image is lower than noise of any one of the multiple images, and a resolution of the fused image is higher than a resolution of any one of the multiple images.

The enhancing module 104 is configured to perform image enhancement processing on the fused image to obtain and output a target image.

The image fusion model includes multiple super-resolution models, and each super-resolution model corresponds to a respective image type.

The fusing module 103 is further configured to perform image segmentation on each processed image without ghost to obtain multiple region images; and input the region images corresponding to a common image type among the multiple region images into the super-resolution model corresponding to the common image type to obtain a fused region image corresponding to the common image type. Noise of the fused region image corresponding to the common image type is lower than that of any one of the multiple region images corresponding to the common image type, and a resolution of the fused region image corresponding to the common image type is higher than a resolution of any one of the region images corresponding to the common image type. In addition, the fusing module 103 is further configured to fuse the fused region images corresponding to different image types to obtain the fused image.

The fusing module 103 is further configured to determine a respective pixel type for each pixel of a processed image without ghost; determine a respective image type for each pixel based on the respective pixel type; and gather pixels corresponding to the common image type into the same region image to obtain multiple region images.

The fusing module 103 is further configured to fuse the fused region images corresponding to different image types based on weights of pixels in the region images corresponding to the fused region images to obtain the fused image.

The super-resolution model includes multiple modules, and each module includes a convolutional layer, a normalization layer, and an activation layer.

The fusing module 103 is further configured to input the region images corresponding to the common image type among the multiple region images into the convolutional layer in the super-resolution model corresponding to the common image type to obtain a convolution result; input the convolution result into a normalization layer to obtain a normalized result; and obtain the fused region image corresponding to the common image type based on the normalized result and the activation layer. An input of the activation layer is the normalized result.

The fusing module 103 is further configured to convert the M convolution kernels having P rows and L column of the convolutional layer in the super-resolution model corresponding to the common image type into a two-dimensional convolution matrix having M rows and P×L columns; where M, P, and L are all positive integers; obtain multiple two-dimensional image matrices to be convolved based on a size of each convolution kernel, a preset convolution sliding stride length, and the multiple region images, where each column in the two-dimensional image matrix to be convolved has a total of P×L pieces of data, data of each column is the data to be intercepted when a convolution operation is performed on a region image with a convolution kernel, and the number of columns of the two-dimensional image matrix to be convolved is a maximum number of convolution operations supported by the region image; and multiply the two-dimensional convolution matrix by each of the two-dimensional image matrix to be convolved to obtain the convolution result.

Different image types of images may include at least one of images with texture characteristics, images with color characteristics, images with shape characteristics, and images of spatial relationship.

The removing module 102 is further configured to align the multiple images; and perform ghost removal processing on multiple aligned images to obtain the multiple processed images without ghosts.

The enhancing module 104 is further configured to perform sharpening processing on the fused image to obtain and output the target image.

Regarding the device in the foregoing embodiment, the specific manner where each module performs operation has been described in detail in the embodiment of the method, and detailed description will not be given here.

Figure 8:
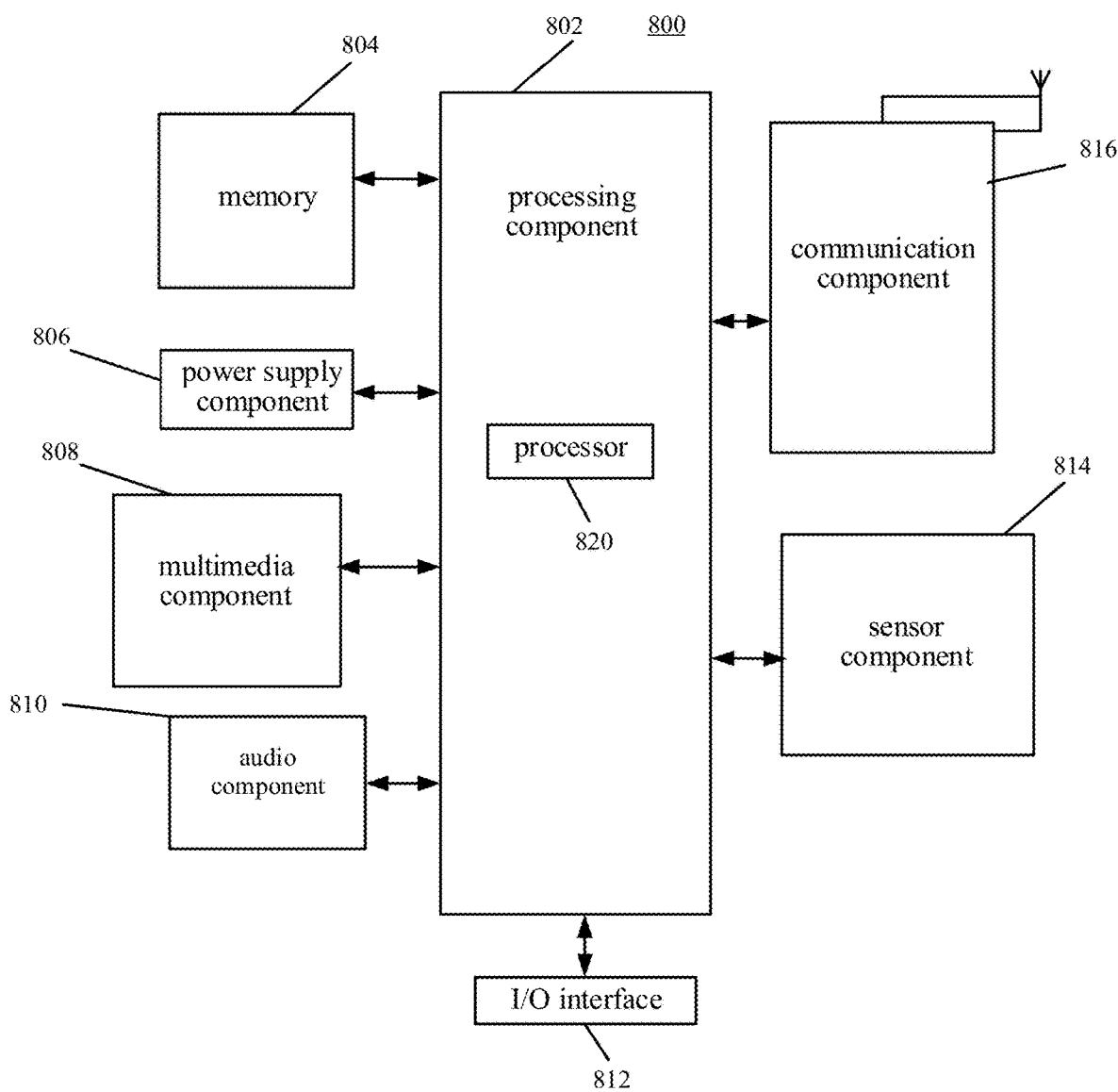
FIG. 8 is a block diagram illustrating a terminal according to some embodiments of the disclosure.

FIG. 8 is a block diagram illustrating a device 800 according to embodiments of the disclosure. For example, the device 800 may be a mobile terminal, such as a mobile phone, a computer, or the like.

As illustrated in FIG. 8, the device 800 may include one or more of the following components: a processing component 802, a memory 804, a power supply component 806, a multimedia component 808, an audio component 810, an input/output (I/O) interface 812, a sensor component 814, and communication component 816.

The processing component 802 generally controls the overall operations of the device 800, such as operations associated with display, telephone calls, data communications, camera operations, and recording operations. The processing component 802 may include one or more processors 820 to execute instructions to complete all or part of the steps of the foregoing method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support the operation of the device 800. Examples of these data include instructions for any application or method operating on the device 800, contact data, phone book data, messages, pictures, videos, etc. The memory 804 can be implemented by any type of volatile or non-volatile storage device or their combination, such as static random-access memory (SRAM), electrically erasable programmable read-only memory (EEPROM), erasable and programmable read-only memory (EPROM), programmable read-only memory (PROM), read-only memory (ROM), magnetic memory, flash memory, magnetic disk, or optical disk.

The power supply component 806 provides power to various components of the device 800. The power supply component 806 may include a power management system, one or more power supplies, and other components associated with the generation, management, and distribution of power for the device 800.

The multimedia component 808 includes a screen that provides an output interface between the device 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor can not only sense the boundary of the touch or slide action, but also detect the duration and pressure related to the touch or slide operation. In some embodiments, the multimedia component 808 includes a front camera and/or a rear camera. When the device 800 is in an operation mode, such as a shooting mode or a video mode, the front camera and/or the rear camera can receive external multimedia data. Each front camera and rear camera can be a fixed optical lens system or have focal length and optical zoom capabilities.

The audio component 810 is configured to output and/or input audio signals. For example, the audio component 810 includes a microphone (MIC). When the device 800 is in an operation mode, such as a call mode, a recording mode, and a voice recognition mode, the microphone is configured to receive external audio signals. The received audio signal can be further stored in the memory 804 or sent via the communication component 816. In some embodiments, the audio component 810 further includes a speaker for outputting audio signals.

The I/O interface 812 provides an interface between the processing component 802 and a peripheral interface module. The above-mentioned peripheral interface module may be a keyboard, a click wheel, a button, and the like. These buttons may include, but are not limited to: home button, volume button, start button, and lock button.

The sensor component 814 includes one or more sensors for providing the device 800 with various status assessments. For example, the sensor component 814 can detect the open/close state of the device 800 and the relative positioning of components, such as the display and keypad of the device 800. The sensor component 814 can also detect the position change of the device 800 or a component of the device 800. The presence or absence of contact with the device 800, the orientation or acceleration/deceleration of the device 800, and the temperature change of the device 800. The sensor component 814 may include a proximity sensor configured to detect the presence of nearby objects when there is no physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the device 800 and other devices. The device 800 can access a wireless network based on a communication standard, such as Wi-Fi, 2G, 3G, 4G, 5G or a combination thereof. In an exemplary embodiment, the communication component 816 receives a broadcast signal or broadcast related information from an external broadcast management system via a broadcast channel. In an exemplary embodiment, the communication component 816 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 800 may be implemented by one or more application specific integrated circuits (ASIC), digital signal processors (DSP), digital signal processing devices (DSPD), programmable logic devices (PLD), field programmable gate array (FPGA), controller, microcontroller, microprocessor, or other electronic components, used to perform the above-mentioned methods.

In an exemplary embodiment, there is also provided a non-transitory computer-readable storage medium including instructions, such as the memory 804 including instructions, and the foregoing instructions may be executed by the processor 820 of the device 800 to complete the foregoing method. For example, the non-transitory computer-readable storage medium may be ROM, random access memory (RAM), CD-ROM, magnetic tape, floppy disk, optical data storage device, etc.

The disclosure further provides a non-transitory computer readable storage medium. When instructions of the storage medium are executed by a processor of a terminal, the terminal is caused to perform a photographing method. The method includes continuously capturing multiple images based on a photographing instruction; obtaining, from the multiple images, multiple processed images without ghosts; inputting the multiple processed images to an image fusion model to obtain a fused image, where noise of the fused image is lower than noise of any one of the multiple images, and a resolution of the fused image is higher than a resolution of any one of the multiple images; and obtaining and outputting a target image by performing image enhancement processing on the fused image.

Those skilled in the art will easily think of other embodiments of the disclosure after considering the specification and practicing the disclosure herein. This a disclosure is intended to cover any variations, uses, or adaptive changes of the disclosure. These variations, uses, or adaptive changes follow the general principles of the disclosure and include common knowledge or conventional technical means in the technical field not disclosed in the disclosure. The description and the embodiments are only regarded as exemplary, and the true scope and spirit of the disclosure are pointed out by the claims.

It is to be understood that the disclosure is not limited to the precise structure that has been described above and shown in the drawings, and various modifications and changes can be made without departing from its scope. The scope of the disclosure is only limited by the appended claims.

What is claimed is:

1. A photographing method, comprising:
   continuously capturing multiple images based on a photographing instruction;
   obtaining, from the multiple images, multiple processed images without ghosts;
   obtaining a fused image by inputting the multiple processed images into an image fusion model, noise of the fused image being lower than noise of any one of the multiple images, and a resolution of the fused image being higher than a resolution of any one of the multiple images; and obtaining and outputting a target image by performing image enhancement processing on the fused image;

wherein the image fusion model comprises multiple super-resolution models, and each super-resolution model corresponds to a respective image type, and each image type is one of image with texture characteristics, image with color characteristics, image with shape characteristics, and image of spatial relationship;

wherein obtaining the fused image comprises:

segmenting each processed image into multiple region images respectively, wherein each region image corresponds to a respective image type;

obtaining a fused region image corresponding to a same image type by inputting region images corresponding to the same image type into a super-resolution model corresponding to the same image type, where noise of the fused region image corresponding to the same image type is lower than that of any one of the multiple region images corresponding to the same image type, and a resolution of the fused region image corresponding to the same image type is higher than a resolution of any one of the region images corresponding to the same image type; and obtaining the fused image by fusing the fused region images corresponding to different image types.

2. The method of claim 1, wherein obtaining the multiple region images comprises:

determining a pixel type for a pixel of the processed image;

determining an image type for the pixel based on the pixel type; and gathering pixels corresponding to the same image type into the same region image, and obtaining the multiple region images.

3. The method of claim 1, wherein obtaining the fused image by fusing the fused region images corresponding to different image types comprises:

obtaining the fused image by fusing the fused region images corresponding to different image types based on weights of pixels in the region images corresponding to the fused region images.

4. The method of claim 1, wherein the super-resolution model comprises multiple modules, and each module comprises a convolutional layer, a normalization layer, and an activation layer;

wherein obtaining the fused region image comprises:

obtaining a convolution result by inputting the region images corresponding to the same image type into the convolutional layer of the super-resolution model corresponding to the same image type;

obtaining a normalized result by inputting the convolution result into the normalization layer; and obtaining the fused region image corresponding to the same image type based on the normalized result and the activation layer, an input of the activation layer being the normalized result.

5. The method of claim 4, wherein obtaining the convolution result comprises:

converting M convolution kernels having P rows and L column of the convolutional layer into a two-dimensional convolution matrix having M rows and P×L columns; where M, P, and L are all positive integers;

obtaining multiple two-dimensional image matrices to be convolved based on a size of each convolution kernel, a preset convolution sliding stride length, and the multiple region images, where each column in the two-dimensional image matrix to be convolved has P×L pieces of data, data of each column is the data to be obtained when a convolution operation is performed on a region image with a convolution kernel, and the number of columns of the two-dimensional image matrix to be convolved is determined based on a preset convolution sliding stride length, a padding length, and a size of a single-frame region image; and obtaining the convolution result by multiplying the two-dimensional convolution matrix by each of the two-dimensional image matrix to be convolved.

6. The method of claim 1, wherein obtaining the multiple processed images comprises:

obtaining multiple aligned images by aligning the multiple images; and obtaining the multiple processed images by performing ghost removal processing on the multiple aligned images.

7. The method of claim 1, wherein obtaining and outputting the target image comprises:

obtaining and outputting the target image by performing sharpening processing on the fused image.

8. A terminal, comprising:

a processor; and a memory storing machine-readable instructions, that when executed by the processor, control the processor to:

continuously capture multiple images based on a photographing instruction;

obtain, from the multiple images, multiple processed images without ghosts;

obtain a fused image by inputting the multiple processed images into an image fusion model, noise of the fused image being lower than noise of any one of the multiple images, and a resolution of the fused image being higher than a resolution of any one of the multiple images; and obtain and output a target image by performing image enhancement processing on the fused image;

wherein the image fusion model comprises multiple super-resolution models, and each super-resolution model corresponds to a respective image type, and each image type is one of image with texture characteristics, image with color characteristics, image with shape characteristics, and image of spatial relationship;

wherein the processor is configured to:

segment a processed image into multiple region images, wherein each region image corresponds to a respective image type;

obtain a fused region image corresponding to a same image type by inputting region images corresponding to the same image type into a super-resolution model corresponding to the same image type, where noise of the fused region image corresponding to the same image type is lower than that of any one of the multiple region images corresponding to the same image type, and a resolution of the fused region image corresponding to the same image type is higher than a resolution of any one of the region images corresponding to the same image type; and wherein the processor is configured to: obtain the fused image by fusing the fused region images corresponding to different image types.

9. The terminal of claim 8, wherein the processor is further configured to:

determine a pixel type for a pixel of the processed image;

determine an image type for the pixel based on the pixel type; and gather pixels corresponding to the same image type into the same region image, and obtain the multiple region images.

10. The terminal of claim 8, wherein the processor is further configured to:
obtain the fused image by fusing the fused region images corresponding to different image types based on weights of pixels in the region images corresponding to the fused region images.

11. The terminal of claim 8, wherein the super-resolution model comprises multiple modules, and each module comprises a convolutional layer, a normalization layer, and an activation layer; and
the processor is further configured to:
obtain a convolution result by inputting the region images corresponding to the same image type into the convolutional layer of the super-resolution model corresponding to the same image type;
obtain a normalized result by inputting the convolution result into the normalization layer; and
obtain the fused region image corresponding to the same image type based on the normalized result and the activation layer, an input of the activation layer being the normalized result.

12. The terminal of claim 11, wherein the processor is further configured to:
convert M convolution kernels having P rows and L column of the convolutional layer into a two-dimensional convolution matrix having M rows and P×L columns; where M, P, and L are all positive integers;
obtain multiple two-dimensional image matrices to be convolved based on a size of each convolution kernel, a preset convolution sliding stride length, and the multiple region images, where each column in the two-dimensional image matrix to be convolved has P×L pieces of data, data of each column is the data to be obtained when a convolution operation is performed on a region image with a convolution kernel, and the number of columns of the two-dimensional image matrix to be convolved is determined based on a preset convolution sliding stride length, a padding length, and a size of a single-frame region image; and
obtain the convolution result by multiplying the two-dimensional convolution matrix by each of the two-dimensional image matrix to be convolved.

13. The terminal of claim 8, wherein different image types of images comprise at least one of images with texture characteristics, images with color characteristics, images with shape characteristics, and images of spatial relationship.

14. The terminal of claim 8, wherein different image types of images comprise at least one of images with texture characteristics, images with color characteristics, images with shape characteristics, and images of spatial relationship.

15. The terminal of claim 8, wherein the processor is further configured to:
obtain multiple aligned images by aligning the multiple images; and
obtain the multiple processed images by performing ghost removal processing on the multiple aligned images.

16. A non-transitory computer readable storage medium, having instructions stored thereon, wherein when the instructions are executed by a processor of a terminal, the terminal is caused to execute a photographing method, the photographing method comprising:
continuously capturing multiple images based on a photographing instruction;
obtaining, from the multiple images, multiple processed images without ghosts;
obtaining a fused image by inputting the multiple processed images into an image fusion model, noise of the fused image being lower than noise of any one of the multiple images, and a resolution of the fused image being higher than a resolution of any one of the multiple images; and
obtaining and outputting a target image by performing image enhancement processing on the fused image;
wherein the image fusion model comprises multiple super-resolution models, and each super-resolution model corresponds to a respective image type, and each image type is one of image with texture characteristics, image with color characteristics, image with shape characteristics, and image of spatial relationship;
wherein obtaining the fused image comprises:
segmenting a processed image into multiple region images, wherein each region image corresponds to a respective image type;
obtaining a fused region image corresponding to a same image type by inputting region images corresponding to the same image type into a super-resolution model corresponding to the same image type, where noise of the fused region image corresponding to the same image type is lower than that of any one of the multiple region images corresponding to the same image type, and a resolution of the fused region image corresponding to the same image type is higher than a resolution of any one of the region images corresponding to the same image type; and
obtaining the fused image by fusing the fused region images corresponding to different image types.

* * * * *